US00RE37616E

(19) United States
(12) Reissued Patent
Schumacher

(10) Patent Number: US RE37,616 E
(45) Date of Reissued Patent: Apr. 2, 2002

(54) PROJECTILE DISCHARGE APPARATUS

(76) Inventor: Dean Patrick Schumacher, 4922 Stamford Dr., W. Bloomfield, MI (US) 48323

(21) Appl. No.: 08/778,059

(22) Filed: Nov. 1, 1996

Related U.S. Patent Documents

Reissue of:
(64) Patent No.: 5,359,985
Issued: Nov. 1, 1994
Appl. No.: 08/027,623
Filed: Mar. 8, 1993

(51) Int. Cl.[7] ..... F41B 7/00; F41B 11/00
(52) U.S. Cl. ..... 124/66; 124/1; 124/64; 124/22
(58) Field of Search ..... 124/66, 72, 22, 124/1, 65, 64; 2/160, 162, 161.5, 163; 446/26

(56) References Cited

U.S. PATENT DOCUMENTS

| | | | | | |
|---|---|---|---|---|---|
| 1,374,242 | A | * | 4/1921 | Sekula | 124/22 |
| 2,006,741 | A | * | 7/1935 | Lefever | 124/66 |
| 2,423,448 | A | * | 7/1947 | Haight | 124/1 |
| 2,888,004 | A | * | 5/1959 | Steiner | 124/16 X |
| 2,922,412 | A | * | 1/1960 | Hosbach, Jr. | 124/66 |
| 3,018,578 | A | * | 1/1962 | Hill | 42/1.11 |
| 3,060,625 | A | * | 10/1962 | Glass et al. | 446/26 |
| 3,119,385 | A | * | 1/1964 | Ashley | 124/22 |
| 3,453,774 | A | * | 7/1969 | Breneman et al. | 446/26 X |
| 4,504,980 | A | * | 3/1985 | Butcher | 2/160 |
| 4,768,681 | A | * | 9/1988 | Dean et al. | 2/160 |
| 4,777,666 | A | * | 10/1988 | Beverlin | 2/161.5 |
| 4,819,609 | A | * | 4/1989 | Tippmann | 124/66 |
| 4,820,229 | A | * | 4/1989 | Spraggins | 446/26 |
| 4,848,307 | A | * | 7/1989 | Tsao | 124/66 |
| 5,123,674 | A | * | 6/1992 | Bagneres et al. | 2/160 X |
| 5,158,208 | A | * | 10/1992 | Wilson | 2/160 |
| 5,186,156 | A | * | 2/1993 | Clayton | 124/66 |
| 5,261,299 | A | * | 11/1993 | Kondos | 2/160 X |
| 5,316,514 | A | * | 5/1994 | Ellman et al. | 446/26 |
| 5,359,985 | A | * | 11/1994 | Schumacher | 124/66 |
| 5,414,868 | A | * | 5/1995 | Crawford | 2/160 |

OTHER PUBLICATIONS

"Rapid Fire Clip Load Dart Gun Set" Advertisement, Imperial Toy Corporation, Los Angeles, CA 90021, 1991.*

* cited by examiner

*Primary Examiner*—Anthony Knight
(74) *Attorney, Agent, or Firm*—Baker, Donelson, Bearman & Caldwell

(57) ABSTRACT

A projectile discharge apparatus 10 having a first generally planar ribbed portion 12 and opposed side portions 14 which form a hand reception recess. Apparatus 10 includes a plurality of chambers 24, 26, 28, 30, and 32 which are adapted to movably receive a dart 34. Apparatus 10 further includes a first member 56 which is movably deployed within each of the chambers 32 and which is movable from a first position to a second dart dispensing position by a downward movement of member 66.

23 Claims, 2 Drawing Sheets

PROJECTILE DISCHARGE APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a projectile discharge apparatus and more particularly to an apparatus containing several projectiles, such as rubber tipped darts, which may be selectively discharged.

2. Discussion

In the past twenty-five years, toy projectile apparatuses and more specifically dart guns have changed very little. Todays toy market requires toys with advanced capabilities and a futuristic appearance. There is therefore a need to provide an apparatus which will revolutionize the entire field of toy projectile apparatuses.

SUMMARY OF THE INVENTION

It is a first object of this invention to provide an apparatus which allows an individual to discharge two or more projectiles simultaneously or successively.

It is another object of this invention to provide an apparatus which allows an individual to contain two or more projectiles in the locked and loaded or ready to fire position.

It is another object of this invention to provide an apparatus which allows an individual to discharge projectiles from an apparatus which rests on top of the back side of a hand.

Therefore, according to a first aspect of the present invention a projectile apparatus or glove is provided. The glove includes several chambers which selectively receive a projectile; and discharge means, deployed in the chambers, for selectively discharging the contained projectiles.

These and other objects, features, and advantages of the present invention will become apparent from a reading of the specification and by reference to the following drawings.

DETAILED DESCRIPTION OF THE PREFERRED EMBODIMENT

Figure 1:
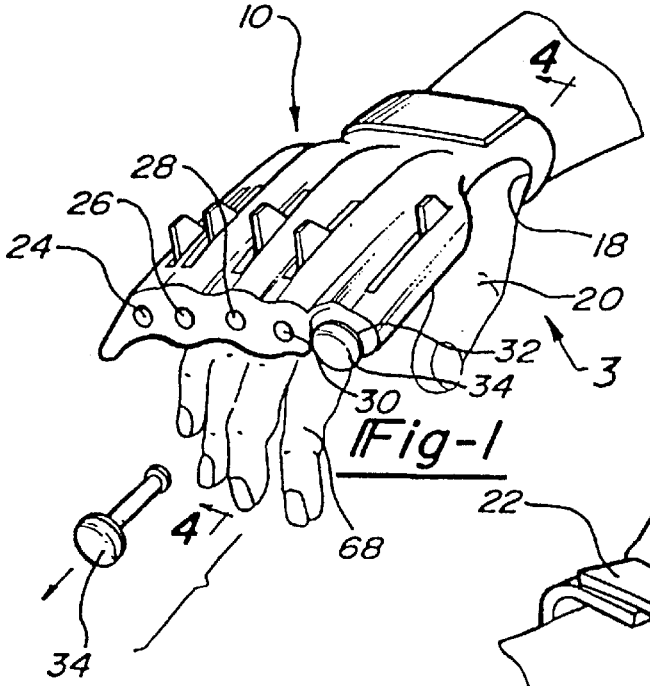
FIG. 1 is a partial perspective top view of a projectile apparatus made in accordance with the teachings of a first embodiment of this invention and shown in deployable relation upon a hand as a projectile is being discharged.
Figure 2:
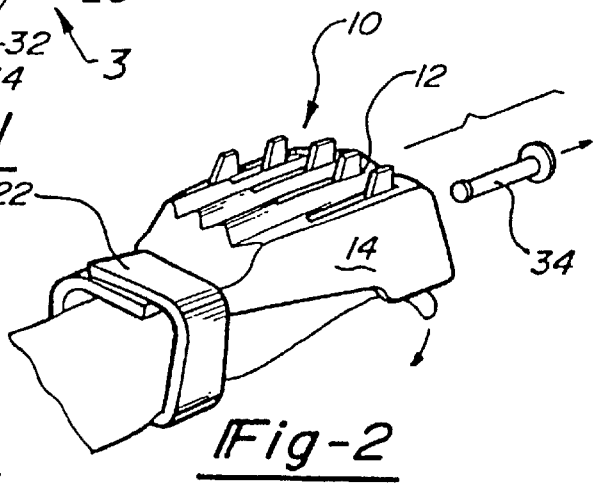
FIG. 2 is a partial perspective side view of the glove shown in FIG. 1.
Figure 3:
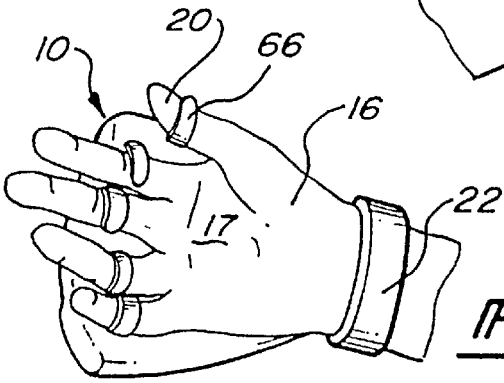
FIG. 3 is a view of the apparatus shown in FIG. 1 taken in the direction of arrow 3.

Referring now to FIGS. 1–3, there is shown a projectile discharge apparatus 10 made in accordance with the teachings of a first embodiment of this invention. As shown, apparatus 10 has a generally ribbed and substantially planar first portion 12 and opposed and downwardly extending side portions 14 which cooperate with planar portion 12 to form a generally cup-shaped recess which is adapted to overlay the back side of hand 16, opposite palm 17. Moreover, portion 12 further includes a thumb reception opening 18 through which thumb 20 is received and a band 22 which is adapted to removably secure apparatus 10 to hand 16.

Figure 4:
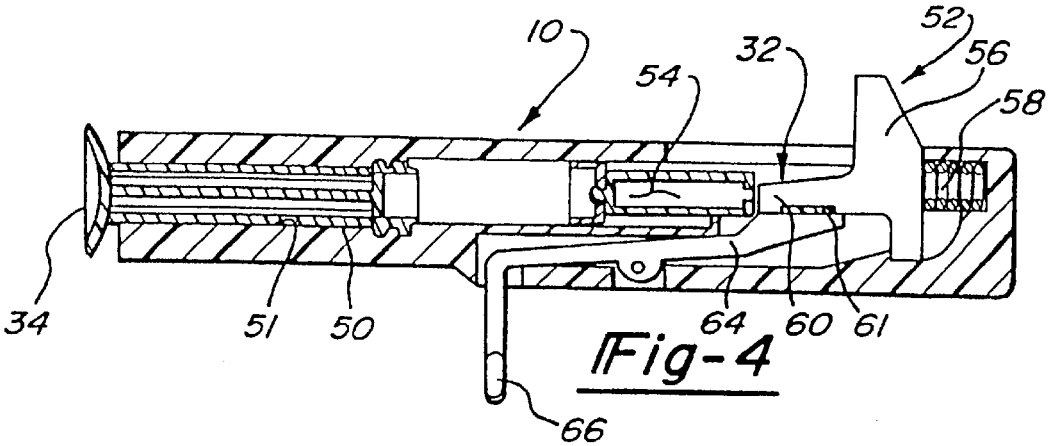
FIG. 4 is a side sectional view of the apparatus shown in FIG. 1 and taken along view line 4—4.
Figure 5:
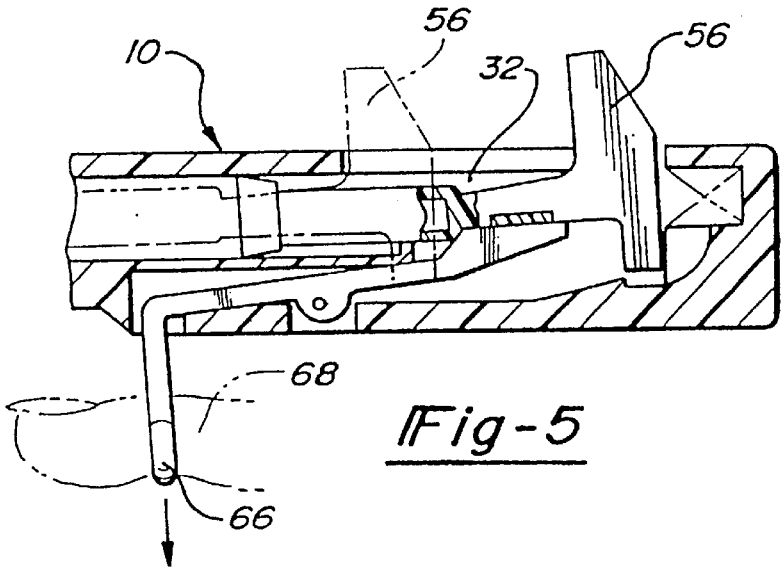
FIG. 5 is a view similar to that shown in FIG. 4 and illustrating the discharge of the projectile shown in FIG. 1.
Figure 6:
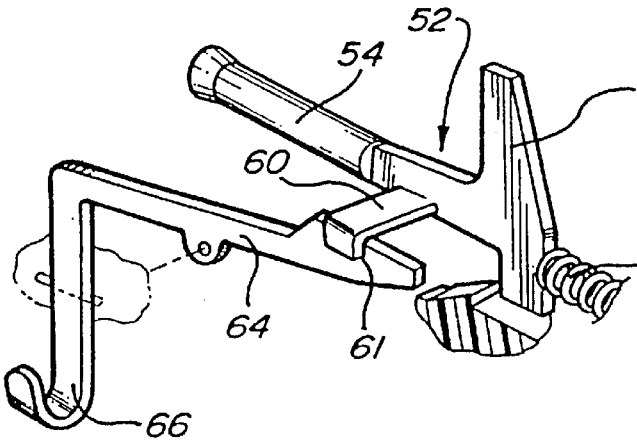
FIG. 6 is a partial cutaway sectional view of the movement mechanism shown in FIG. 5.

As further shown, apparatus 10 includes five projectile reception chambers 24, 26, 28, 30, and 32 which are adapted to dischargedly receive unique projectiles 34, such as rubber tipped darts. To understand the manner in which darts 34 are contained within and discharged from apparatus 10, reference is now made to FIGS. 4–6. It should be noted that the following discussion relates to chamber 32 but that the discussion is also substantially descriptive of each of the other chambers 24, 26, 28, and 30.

As shown, chamber 32 includes a first narrow portion 50 which has a diameter slightly larger than the diameter of the body 51 of dart 34. In this manner, dart 34 is frictionally secured within portion 50. Moreover, chamber 34 also includes a dart discharge member 52 having a first portion 54 which is longitudinally deployed within chamber 32 and a second flanged portion 56 which is coupled to a spring 58. As shown, portion 58 further includes an outwardly and horizontally projecting portion 60 having a recessed portion 61 which is in selective engagement with *trigger* member 64. Member 64 is pivotally deployed within chamber 32 and includes a rounded portion 66 which is adapted to substantially encircle [finger 68] *thumb 20*.

In operation, member 56 is pushed or biased against spring 58 before dart 34 is deployed within chamber 32. After such biasing has occurred, member 64 is moved to a first locking position in which portion 64 engages and is contained in recessed portion 61 thereby preventing the biased spring from moving member 56 within the chamber 32. Subsequently, dart 34 is frictionally deployed within portion 50 of chamber 32. When it is desired to shoot or discharge dart 34, portion 66 is moved downward thereby disengaging portion 61 from portion 60. Upon such disengagement, biased spring 58 pushes member 56 in a longitudinal manner within chamber 32. Such movement, shown in phantom in FIG. 5, causes air residing within the chamber to be compressed and to force dart 34 outward from apparatus 10. In a similar manner, each of the other darts 24–30 may be concurrently or successively dispensed or shot from apparatus 10 by the movement of identical portions 66 within each of the other chambers 24–30.

Figure 7:
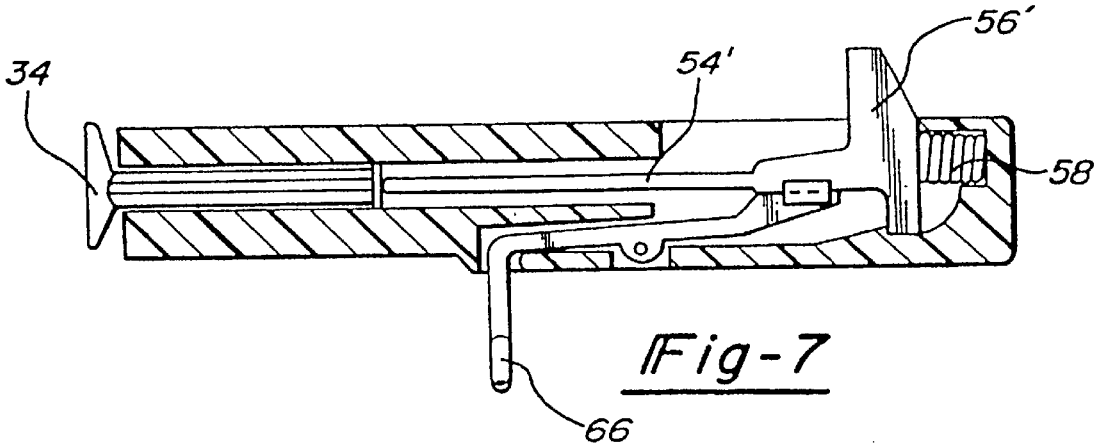
FIG. 7 is a side sectional view of a projectile apparatus made in accordance with the teachings of a second embodiment of this invention.

While this first embodiment of apparatus 10 is satisfactory, in order to increase the distance travelled by dart 34 it was found to be necessary to increase the discharge force applied to dart 34. To increase dart discharge force, a modified member 56' was used and is shown in FIG. 7. Specifically, member 56' differs from member 56 in that member 56' includes a substantially longer and narrower portion 54' which is made to actually contact dart 34 upon a downward movement of portion 66. In this manner, dart 34 may be moved farther than is possible with the first embodiment of apparatus 10.

It should be appreciated by those of ordinary skill in the art that projectile discharge apparatus 10 will also allow for a quick and efficient playing of the game of darts and increase the enjoyment associated therewith. Moreover, it should also be appreciated by one of ordinary skill in the art that darts 34 may be replaced with other types of projectiles such as paint balls. Use of these projectiles may require chambers 24–32 to be modified in size and shape in order to allow for the desired and aforedescribed projectile frictional engagement within the chambers 24–32 and may further require modifications to portions 54 and 54', necessary to adequately discharge these alternate projectiles. Moreover, it should further be appreciated that alternate means of projectile discharge (i.e. air chambers) may be used. Moreover, it should also be apparent that multiple projectiles may simultaneously or successively discharged from apparatus 10.

It is to be understood that the invention is not limited to the exact construction or method illustrated and described above, but that various changes and modifications may be made without departing from the spirit and scope of the invention as set forth in the following claims.

I claim:

1. A projectile apparatus comprising:

a planar portion having a first chamber and a second chamber;

a first projectile which is movably deployed within said first chamber;

a second projectile which is movably deployed within said second chamber;

a first movement means deployed within said first chamber and selectively activated to discharge said first projectile from said first chamber;

a second movement means deployed within said second chamber and selectively activated to discharge said second projectile from said second chamber;

means for positioning said planar portion on top of a hand of an operator of said projectile apparatus;

a first release mechanism means adjacent said planar portion, said first release mechanism means activating said first movement means, said first release mechanism means adapted to align with a first extended finger of said hand for actuation by said first extended finger; and a second release mechanism means adjacent said planar portion, said second release mechanism means activating said second movement means, said second release mechanism means adapted to align with a second extended finger of said hand for actuation by said second extended finger, each said first and second release mechanism means being thereby adapted for actuation individually by separate individual fingers of said hand for successive or simultaneous discharge of said first and second projectiles, whereby the same said hand positions said planar portion and actuates said first and second release mechanism means.

2. The projectile apparatus of claim 1, wherein each said first and second projectile is a suction tipped dart.

3. The projectile apparatus of claim 1, wherein said means for positioning said planar portion is a band which selectively attaches said planar portion to said hand.

4. The projectile apparatus of claim 1 wherein at least one said release mechanism means extends outwardly away from said planar portion, said release mechanism means having a finger reception recess adapted to correspond with a curvature of a respective said finger of said hand.

5. The projectile apparatus of claim 4 wherein said planar portion has a forward end, said projectiles being released from said planar portion at said forward end, said release mechanism means extending from said planar portion at a location in close proximity to said forward end.

6. The projectile apparatus of claim 1 wherein at least one said release mechanism means extends from said planar member at a position adapted to be beyond a palm area of said hand with respect to said operator so that the release mechanism means is activated by the under surface of a respective finger.

7. The projectile apparatus of claim 1 wherein at least one said release mechanism means includes a portion generally perpendicular to said planar portion.

8. The projectile apparatus of claim 1 wherein said planar portion includes a third chamber, said projectile apparatus further comprising:

a third projectile which is movably deployed within said third chamber;

a third movement means deployed within said third chamber and selectively activated to discharge said third projectile from said third chamber;

a third release mechanism means adjacent said planar portion, said third release mechanism means activating said third movement means, said third release mechanism means adapted to align with a third extended finger of said hand for actuation by said third extended finger.

9. A projectile apparatus comprising:

a planar portion and opposed side portions which cooperatively form a hand reception recess adapted for a hand of an apparatus operator;

a first chamber received within said planar portion, said first chamber extending along a first axis;

a second chamber received within said planar portion, said second chamber extending along a second axis generally parallel to said first axis;

a first projectile which is movably deployed within said first chamber;

a second projectile which is movably deployed within said second chamber;

a first movement means deployed within said first chamber and selectively activated to discharge said first projectile from said first chamber;

a second movement means deployed within said second chamber and selectively activated to discharge said second projectile from said second chamber;

a first release mechanism extending outwardly away from said planar portion and having a curved portion, said first release mechanism activating said first movement means, said first release mechanism adapted to align with a first finger of said hand, said curved portion adapted to correspond with a curvature of said first finger for actuation by said first finger; and a second release mechanism extending outwardly away from said planar portion and having a curved portion, said second release mechanism activating said second movement means, said second release mechanism adapted to align with a second finger of said hand, said curved portion adapted to correspond with a curvature of said second finger for actuation by said second finger, each said first and second release mechanisms being thereby adapted for actuation individually by separate individual fingers of said hand for successive or simultaneous discharge of said first and second projectiles, whereby the same said hand positions said planar portion and actuates said first and second release mechanisms.

10. The projectile apparatus of claim 9, wherein each of said projectiles is a rubber tipped dart.

11. The projectile apparatus of claim 9 further comprising a band which selectively attaches said apparatus to said hand.

12. A toy projectile discharge apparatus comprising:

a plurality of toy projectiles;

a planar portion having a plurality of reception chambers, each chamber of said chambers being adapted to receive one of said plurality of toy projectiles;

a plurality of discharge means, one said plurality of discharge means associated with each one of said plurality of chambers, said discharge means discharging said plurality of toy projectiles, said means including an air chamber wherein air is released to impart a force sufficient to propel said toy projectile from said chamber, each of said plurality of toy projectiles being directly discharged from one of said plurality of chambers;

a first release mechanism means extending outwardly away from said planar portion, said first release mechanism means activating one of said discharge means, said first release mechanism means positioned for actuation by a first finger of a hand of an [Operator] *operator* of said projectile apparatus, said first release mechanism means positioned for actuation by said first finger; and a second release mechanism means adjacent said planar portion, said second release mechanism means activating one of said discharge means, said second release mechanism means positioned for actuation by a second finger of said hand, said second release mechanism means positioned for actuation by said second finger, each said first and second release mechanism means being thereby adapted for actuation individually by separate individual fingers of said hand for successive or simultaneous discharge of said first and second projectiles, whereby the same said hand positions said planar portion and actuates said first and second release mechanism means.

13. The toy projectile discharge apparatus of claim 12 wherein said plurality of toy projectiles comprise rubber tipped darts.

[14. The toy projectile discharge apparatus of claim 12 wherein said plurality of toy projectiles comprise paint balls.]

15. The toy projectile discharge apparatus of claim 12 wherein each said toy projectile is propelled several feet from each respective said chamber.

16. The projectile apparatus of claim 12 wherein each said release mechanism means extends outwardly away from said planar portion, each release mechanism means having a finger reception recess adapted to correspond with a curvature of a respective said finger of said hand.

*17. A projectile apparatus comprising:*

*a housing having a recess adapted to overlay the back side of a select hand of an operator, said housing having first and second reception chambers;*

*a first projectile sized and shaped to be received within said first reception chamber;*

*a second projectile sized and shaped to be received within said second reception chamber;*

*first discharge means associated with said first reception chamber for causing a discharge force upon said first projectile sufficient to project said first projectile from said first reception chamber;*

*second discharge means associated with said second reception chamber for causing a discharge force upon said second projectile sufficient to project said second projectile from said second reception chamber;*

*trigger means for triggering said first discharge means and said second discharge means, said trigger means being positioned to be engaged by the fingers of the select hand of an operator so that the mounting and firing of the apparatus is conducted by a single hand.*

*18. The projectile apparatus of claim 17 wherein said trigger means may be actuated to trigger said first and second discharge means sequentially or substantially simultaneously.*

*19. The projectile apparatus of claim 17 wherein said first and second discharge means each comprise an air chamber having an opening in fluid communication with said associated reception chamber, a compressing portion mounted within said air chamber for reciprocal movement therein, and biasing means for biasing said compressing portion toward said air chamber opening, whereby the movement of the compressing portion toward the opening causes air within the chamber to be compressed and expelled through the opening into the associated reception chamber for propelling the projectile therein.*

*20. The projectile apparatus of claim 17 wherein said first and second discharge means each include a channel, moveable member means movably mounted within said channel, spring means biasing said moveable member means in one direction, and a grasping portion associated with said moveable member means extending from said housing and configured to be grasped by the operator for movement of said moveable member means in a direction opposite said spring means biasing direction.*

*21. The projectile apparatus of claim 20 wherein said triggering means comprises a moveable trigger member adapted to releasably engage said moveable member means.*

*22. The projectile apparatus of claim 20 wherein each said channel of said first and second discharge means has an opening in fluid communication with said associated reception chamber, and wherein said moveable member means comprises compressing portion slidably mounted within said air chamber for reciprocal movement therein, and wherein said spring means biases said moveable member means in a direction towards said opening, whereby the movement of the compressing portion toward the opening causes air within the channel to be compressed and expelled through the opening into the associated reception chamber for propelling the projectile therein.*

*23. The projectile apparatus of claim 17 wherein said trigger means comprises a trigger member configured to be engaged and actuated by the outstretched finger of an operator.*

*24. The projectile apparatus of claim 20 wherein said moveable member contacts said projectile for projection of said projectile.*

* * * * *